(12) United States Patent
Dhong et al.

(10) Patent No.: US 6,360,238 B1
(45) Date of Patent: Mar. 19, 2002

(54) LEADING ZERO/ONE ANTICIPATOR HAVING AN INTEGRATED SIGN SELECTOR

(75) Inventors: Sang Hoo Dhong; Kyung Tek Lee; Hung Cai Ngo, all of Austin; Kevin John Nowka, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/270,469

(22) Filed: Mar. 15, 1999

(51) Int. Cl.[7] .................................................. G06F 5/01
(52) U.S. Cl. ........................................ 708/205; 708/211
(58) Field of Search ................................ 708/205, 211, 708/505

(56) References Cited

U.S. PATENT DOCUMENTS

| | | | |
|---|---|---|---|
| 5,633,819 A | * | 5/1997 | Brashears et al. ........... 708/205 |
| 5,920,493 A | * | 7/1999 | Lau ............................ 708/205 |
| 5,974,432 A | * | 10/1999 | Orup ........................... 708/205 |
| 6,085,208 A | * | 7/2000 | Oberman et al. ........... 708/205 |
| 6,101,516 A | * | 8/2000 | Wolrich et al. ............. 708/205 |

* cited by examiner

*Primary Examiner*—David H. Malzahn
(74) *Attorney, Agent, or Firm*—Casimer K. Salys; Bracewell & Patterson, L.L.P.

(57) ABSTRACT

A zero/one anticipator having an integrated sign selector is disclosed. A leading zeros string and a leading ones string are generated by examining carry propagates, generates, and kills of two adjacent bits of two input operands to an adder within a floating-point processor. The leading zeros string is for a positive sum, and the leading ones string is for a negative sum. A normalization shift amount is then determined from the leading zeros string and the leading ones string. A sign of a sum of the two input operands is then determined separately but concurrently with the normalization shift amount determination process. The sign is then utilized to select either the positive sum or the negative sum for a proper normalization shift amount.

12 Claims, 3 Drawing Sheets

LEADING ZERO/ONE ANTICIPATOR HAVING AN INTEGRATED SIGN SELECTOR

RELATED PATENT APPLICATION

The present patent application is related to an allowed application U.S. Ser. No. 09/139,940, filed on Aug. 25, 1998, now U.S. Pat No. 6,178,437 entitled "METHOD AND APPARATUS FOR ANTICIPATING LEADING DIGITS AND NORMALIZATION SHIFT AMOUNTS IN A FLOATING-POINT PROCESSOR".

BACKGROUND OF THE INVENTION

1. Technical Field

The present invention relates to an apparatus for data processing in general, and in particular to an apparatus for performing result normalization in a floating-point processor. Still more particularly, the present invention relates to a leading zero/one anticipator in a floating-point processor.

2. Description of the Prior Art

According to the. IEEE 754 standard, floating-point numbers are represented by three elements, namely, a binary sign bit, a binary encoded exponent, and a binary encoded mantissa. In a normalized floating-point number, the exponent is that which ensures the first digit of the mantissa is a logical one (except for special cases such as zero, infinities, and unrepresentable numbers). During a normalized floating-point addition, one of the mantissas of the addend and adder is shifted and the exponent is incremented or decremented until the exponents for both the addend and adder are equal. This shifting process is known as alignment. Once aligned, the mantissas of the addend and adder are added or subtracted depending upon the signs of the addend and adder as well as the type of operation (either addition or substraction) to be performed. Once the result (either sum or difference) is formed, the sign of the resulting mantissa is examined. If the sign of the result is negative, the boolean complement of the result is initially formed, and the sign is then complemented. In order to convert the result to a normalized form, the exponent of the result is decremented and the mantissa of the result is left-shifted until the leading digit of the mantissa is a logical one (in absence of exceptional conditions such as those mentioned supra).

The processing of removing leading zeros or leading ones from a respective positive or negative output of a floating-point adder is known as normalization. Full-precision leading-zero anticipators (LZAs) (or leading-zero predictors) are commonly utilized to improve the speed of a normalization process. An LZA can be the most critical path of a floating-point adder because it is not obvious a priori whether the result from the adder will be positive or negative. Thus, it is necessary to perform both leading-zero and leading-one analysis so that a proper normalization shift amount can be selected based upon the sign of the result when the result is finally available.

The prior art process of sign determination is typically accomplished via a floating-point adder. With the improved LZA architecture as disclosed in the above-mentioned related patent application, the prior art process of sign determination becomes the bottle-neck of a normalization process. The present disclosure describes an improved sign determination mechanism that complements the LZA described in the above-mentioned related patent application.

SUMMARY OF THE INVENTION

In accordance with a preferred embodiment of the present invention, a leading zeros string and a leading ones string are generated by examining carry propagates, generates, and kills of two adjacent bits of two input operands to an adder within a floating-point processor. The leading zeros string is for a positive sum, and the leading ones string is for a negative sum. A normalization shift amount is then determined from the leading zeros string and the leading ones string. A sign of a sum of the two input operands is then determined separately but concurrently with the normalization shift amount determination process. The sign is then utilized to select either the positive sum or the negative sum for a proper normalization shift amount.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of processors having a floating-point adder. The processor may be, for example, a reduced instruction set computer (RISC) processor or a complex instruction set computer (CISC) processor. For the purpose of illustration, a preferred embodiment of the present invention, as described below, is implemented on a RISC processor, such as the PowerPC™ processor manufactured by International Business Machines Corporation of Armonk, N.Y.

Figure 1:
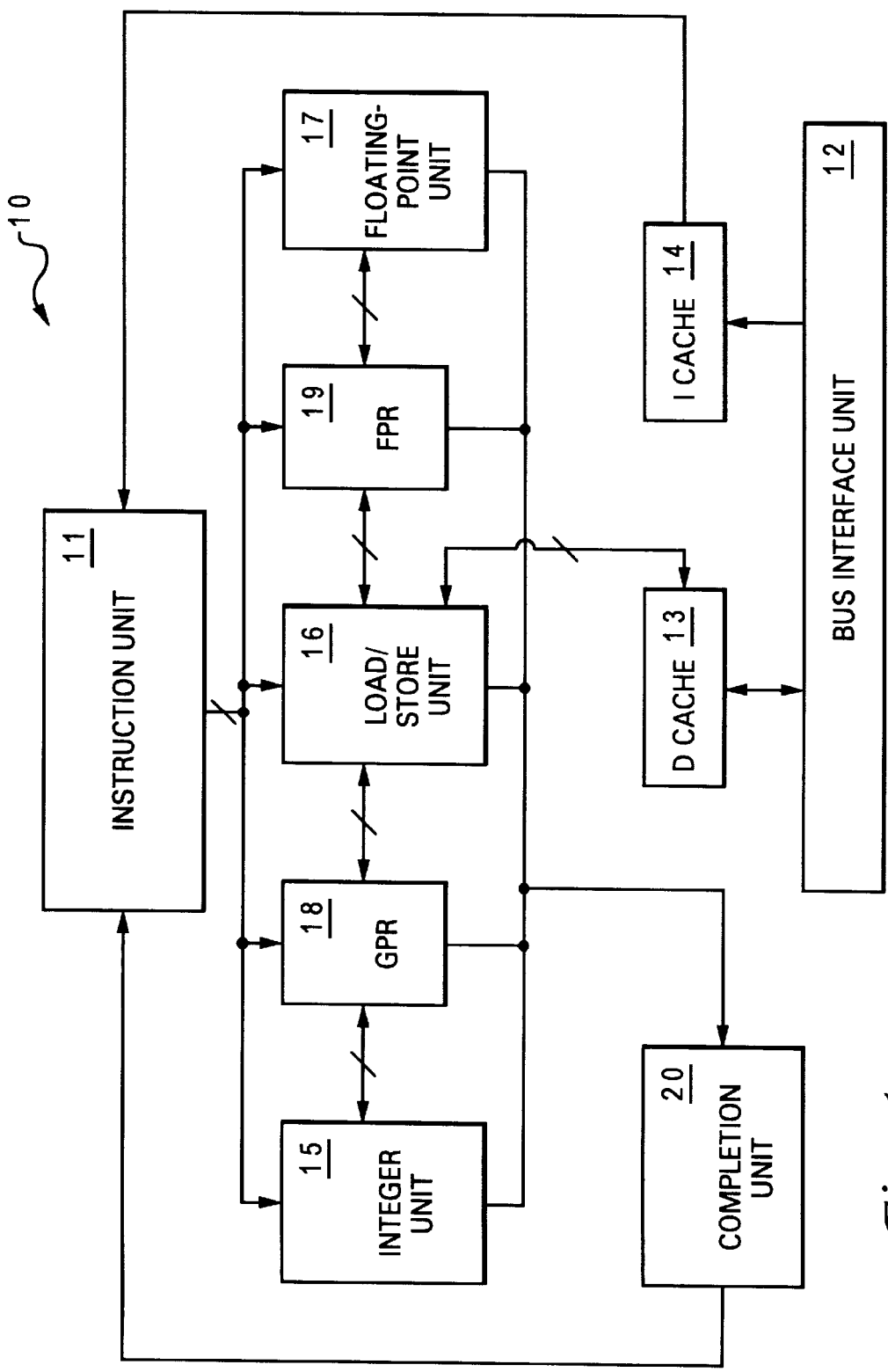
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution of an instruction has terminated, an execution unit 15–17 stores data results to a respective rename buffer, depending upon the instruction type. Then, any one of execution units 15–17 may signal a completion unit 20 that the instruction unit has finished execution of an instruction. Finally, instructions are completed in program order, and result data are transferred from the respective rename buffer to one of general purpose registers 18 or floating-point registers 19.

Figure 2:
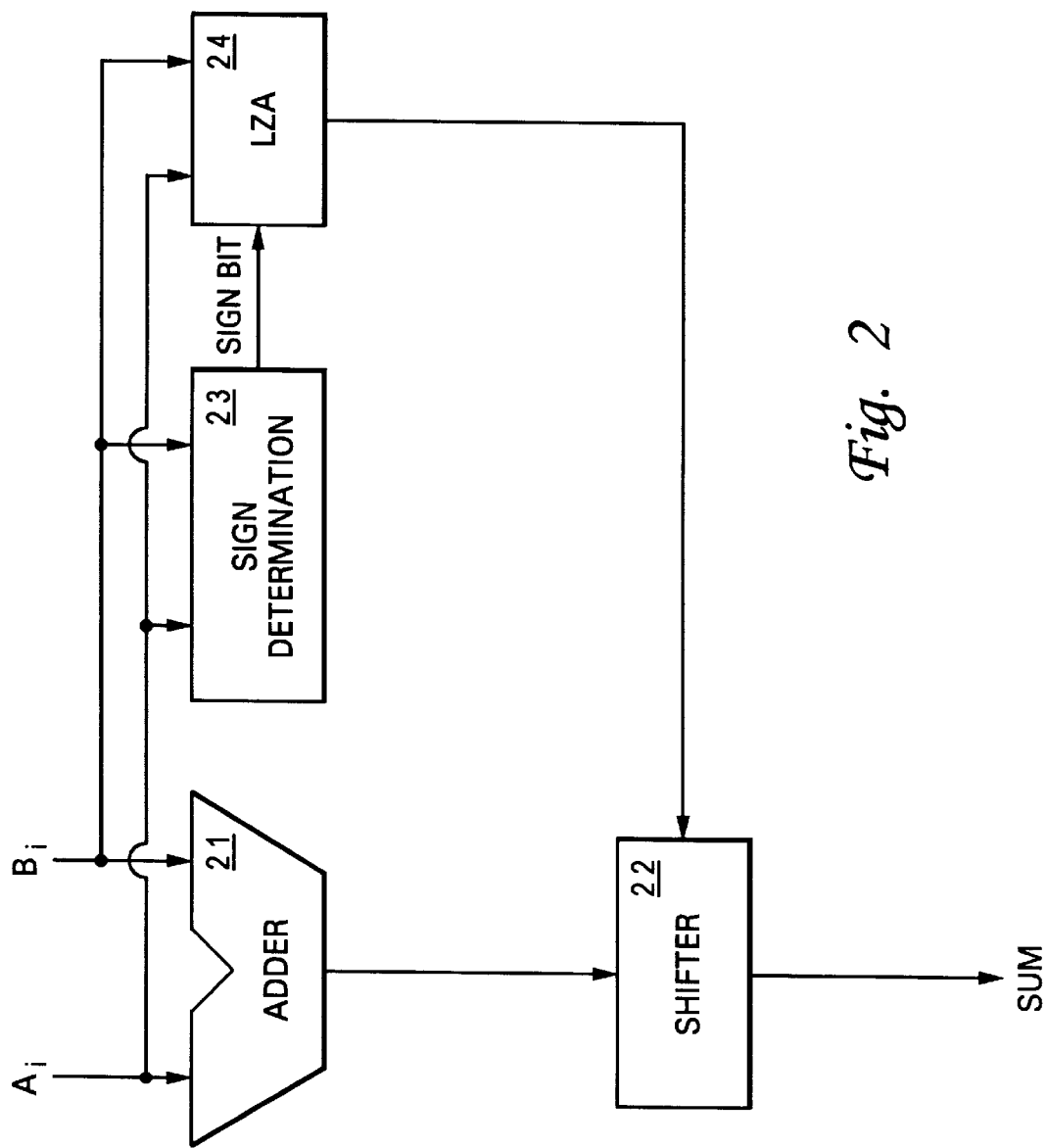
FIG. 2 is a block diagram of a sign determination module in relation to a leading zero anticipator (LZA) and a floating-point adder, in accordance with a preferred embodiment of the present invention.

With reference now to FIG. 2, there is depicted a block diagram of a sign determination module in relation to a leading zero anticipator (LZA) within floating-point unit 17 from FIG. 1, in accordance with a preferred embodiment of the present invention. As shown, a LZA 24 operates in parallel with the clocked operation of a floating-point adder 21 to determine the number of bit positions that must be introduced by a shifter 22 to normalize the mantissa of a floating-point result of the addition of input operands $A_i$ and $B_i$. In order to speed up the normalization process, the mantissas of the addend and adder (or subtrahend and subtractor) are examined to predict the position of the leading logical zeros (or ones) of the floating-point result. This prediction is performed during the addition (or substraction) operation within adder 21.

In accordance with a preferred embodiment of the present invention, the determination of a sign for a sum result of input operands $A_i$ and $B_i$ is performed by a sign determination module 23. The sign determination is performed in parallel with the calculation of a normalization amount for the sum result within LZA 24. Subsequent normalization shifts are performed by shifter 22 in response to the result from sign determination module 23.

Broadly speaking, LZA 24 examines carry propagates ($P_i$), generates ($G_i$) and kills ($Z_i$) of two adjacent bits of the input operands $A_i$ and $B_i$ to adder 21 to generate a leading zeros string for a positive sum and a leading ones string for a negative sum. As defined, $$P_i = A_i \text{ XOR } B_i \tag{1}$$

$$G_i = A_i \text{ AND } B_i \tag{2}$$

$$Z_i = \overline{A_i} \text{ AND } \overline{B_i} \tag{3}$$

Because the sign of the sum result is not known initially, both positive and negative sum strings are computed. The positive sum string determines the location of the first non-zero digit in a positive sum. For each bit position in the string a logical one in the sum string indicates a potential location of the first non-one bit in the sum. By examining the positive sum string from the most significant to the least significant position, the true first non-zero position is determined. The negative sum string determines the location of the first non-zero digit in a negative sum. For each bit position in the string a logical one in the sum string indicates a potential location of the first non-one bit in the sum. By examining the negative sum string from the most significant to the least significant position, the true first non-one position is determined.

Figure 3:
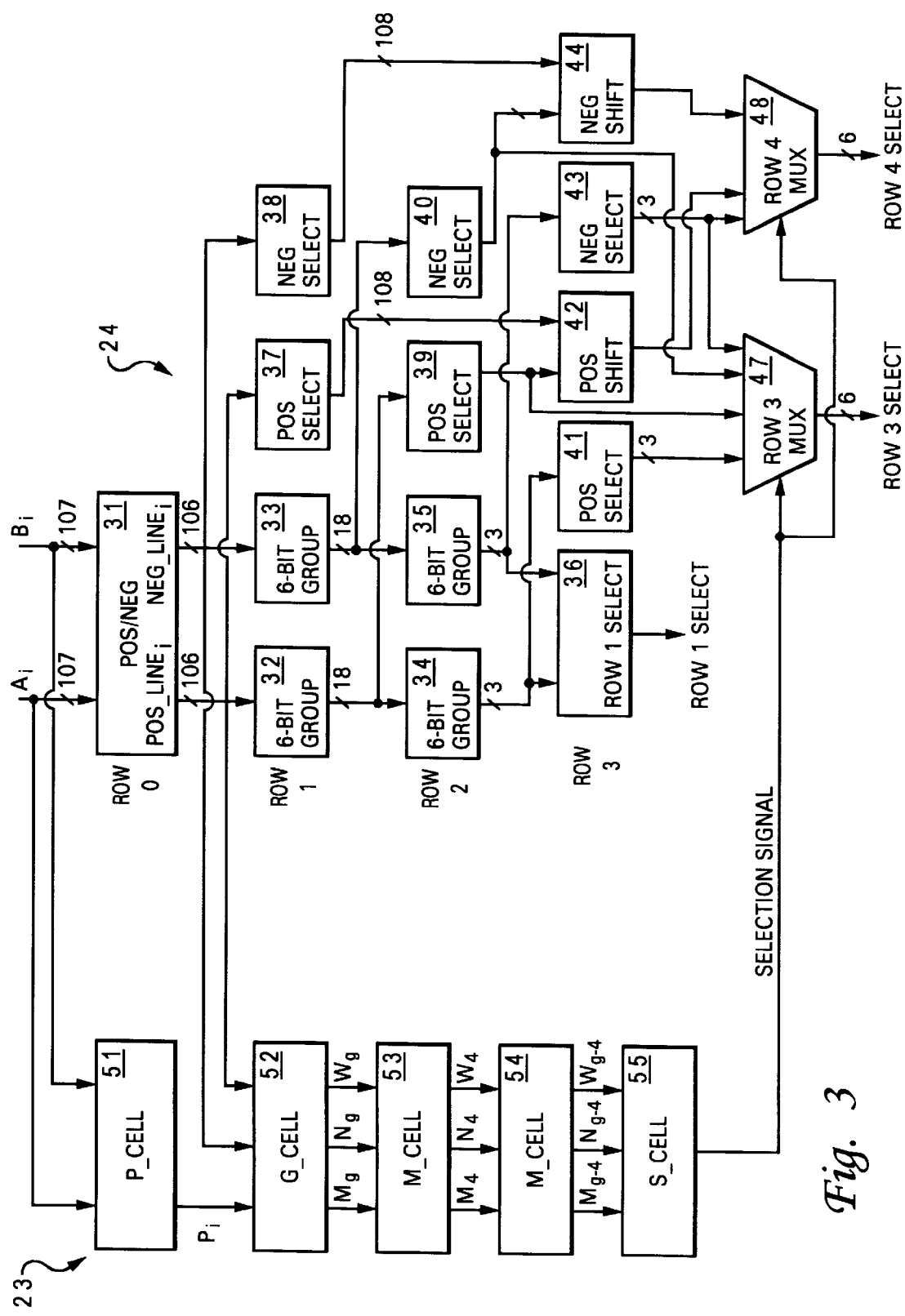
FIG. 3 is a detailed block diagram of the sign determination module along with the LZA from FIG. 2, in accordance with a preferred embodiment of the present invention.

Referring now to FIG. 3, there is illustrated a detailed block diagram of sign determination module 23 along with LZA 24 from FIG. 2, in accordance with a preferred embodiment of the present invention. As shown, positive leading zero line POS_LINE$_i$ and negative leading one line NEG_LINE$_i$ are calculated concurrently from input operands $A_i$ and $B_i$ via a POS/NEG module 31. For the purpose of illustration, each of operands $A_i$ and $B_i$ is 107 bits in length. The positive leading zero line POS_LINE$_i$ and negative leading one line NEG_LINE$_i$ are calculated as follows:

$$\text{POS\_LINE}_i = P_i \text{ XNOR } Z_{i+1} \tag{4}$$

$$\text{NEG\_LINE}_i = P_i \text{ XNOR } G_{i+1} \tag{5}$$

where $P_i = A_i$ XOR $B_i$, $G_i = A_i$ AND $B_i$, and $Z_i = \overline{A_i}$ AND $\overline{B_i}$.

The positive leading zero line POS_LINE$_i$, which is 106 bits in length, is then divided into 18 groups under Pos Group 32 in row 1, each group having six bits. All six groups are evaluated concurrently, and one bit is computed for each of the 18 groups from Pos Group 32. Each bit represents the logical OR of the six bits within a group. These 18 bits are then divided into three groups under Pos Group 34 in row 2, each group having six bits. All three groups are evaluated concurrently, and one bit is computed for each of the three groups from Pos Group 34. Each bit represents the logical OR of the six bits within a group. Similarly, the negative leading one line NEG_LINE$_i$, which is 106 bits in length, is divided into 18 groups under Neg Group 33 in row 1, each group having six bits. All six groups are evaluated concurrently, and one bit is computed for each of the 18 groups from Neg Group 33. Each bit represents the logical OR of the six bits within a group. These 18 bits are then divided into three groups under Neg Group 35 in row 2, each group having six bits. All three groups are evaluated concurrently, and one bit is computed from each of the three groups from Neg Group 35. Each bit represents the logical OR of the six bits within a group. Finally, the six bits in row 2 (three bits from the POS_LINE$_i$ and three bits from the NEG_LINE$_i$) are priority encoded within ROW 1 select 36 to form the selection of the normalization amount in groups of 36 bits. Thus, these three bits correspond to a normalization shift of 0, 36, or 72 bit positions.

All of the above selections are performed by a 12-bit shift-control. For example, if a logical one exists in the first six-bit group within Pos Group 34, a 12-bit shift control calculated from the first six-bit group will be selected. However, if there is no logical one in the first six-bit group but there is a logical one in the second six-bit group, the 12-bit shift control calculated from the second six-bit group will be selected. Otherwise, the 12-bit shift control generated from the third six-bit group will be selected.

The logical expression for the six-bit group logic in row 1 can be summarized as follows:

$$\text{POS\_GRP\_0} = \text{POS\_LINE}_0 \vee \text{POS\_LINE}_1 \vee \ldots \text{POS\_LINE}_5$$

$$\text{POS\_GRP\_1} = \text{POS\_LINE}_6 \vee \text{POS\_LINE}_7 \vee \ldots \text{POS\_LINE}_{11}$$

$$\vdots$$

$$\text{POS\_GRP\_17} = \text{POS\_LINE}_{100} \vee \text{POS\_LINE}_{101} \vee \ldots \text{POS\_LINE}_{105}$$

and $$\text{NEG\_GRP\_0} = \text{NEG\_LINE}_0 \vee \text{NEG\_LINE}_1 \vee \ldots \text{NEG\_LINE}_5$$

$$\text{NEG\_GRP\_1} = \text{NEG\_LINE}_6 \vee \text{NEG\_LINE}_7 \vee \ldots \text{NEG\_LINE}_{11}$$

$$\vdots$$

$$\text{NEG\_GRP\_17} = \text{NEG\_LINE}_{100} \vee \text{NEG\_LINE}_{101} \vee \ldots \text{NEG\_LINE}_{105}$$

where $\vee$ is the boolean operator OR.

In the meantime, the positive leading zero line POS_LINE$_i$ is also divided into 18 groups under Pos Select 37 in row 1, each group having six bits. All 18 groups are evaluated concurrently. For each of group of 6-bits, the most significant logical "1" in each group is found. The output of the Pos Select 37 is 6 bits in which a "1" in the output signifies the position of the most significant "1" in this group and a "0" indicates a position that does not contain the most significant "1" in the group. One bit is selected from each of the 18 groups from Pos Select 37. Similarly, the negative leading one line NEG_LINE$_i$ is divided into 18 groups under Neg Select 38 in row 1, each group having six bits. All 18 groups are evaluated concurrently. For each of group of 6-bits, the most significant logical 1 in each group is found. The output of the Neg Select 38 is 6 bits in which a "1" in the output signifies the position of the most significant "1" in this group and a "0" indicates a position that does not contain the most significant "1" in the group. One bit is selected from each of the 18 groups from Neg Select 38.

In addition, the 18 bits from Pos Group 32 in row 1 are then divided into three groups under Pos Select 39 in row 2, each group having six bits. All three groups are evaluated concurrently, and one bit is chosen from each of the three groups from Pos Select 39. Similarly, the 18 bits from Neg Group 33 in row 1 are then divided into three groups under Neg Select 40 in row 2, each group having six bits. All three groups are evaluated concurrently, and one bit is chosen from each of the three groups from Neg Select 40. The output of Pos Select 39 (and similarly Neg Select 40) is 6 bits in which a "1" in the output signifies the position of the group location that contain the most significant "1" of the six groups and a "0" indicates a group position which does not contain the most significant one of the six groups.

Further, in row 3, the three bits from Pos Group 34 are sent to Pos Select 41. The output of Pos Select 41 is 3 bits in which a "1" in the output signifies the position of the group location that contains the most significant "1" of the three groups and a "0" indicates a group position that does not contain the most significant "1" of the three groups. Similarly, the three from Neg Group 35 are encoded to three bits by Neg Select 43.

The 108 bits from Pos Select 37 are sent to Pos Shift 42. Under the control of the 18-bits from Pos Select 37, 18 of the 108 input bits are selected and driven out by Pos Shift 42. These bits represent three sets of six bits that are the location of the most significant "1" within the 6-bit boundary for the possible cases where the first one lies in the first, second and third group of 36 bits in POS LINE. Neg Shift 44 produces the same bits based upon input from Neg Select 40 and Neg Select 38.

Subsequently, the normalization amounts for the third and forth normalizer levels are generated in a row 3 A multiplexor 47 and a row 4 multiplexor 48, respectively. Row 3 multiplexor 47 generates the normalization shift amount of 0, 6, 12, 18, 24 or 30 based upon the sign bit from adder 21 that selects between Pos Select 39 data and Neg Select 40 data and upon the selection conditions of Pos Select 41 and Neg Select 43. Row 4 multiplexor 48 generates the normalization amount of 0, 1, 2, 3, 4, or 5 based upon sign bit, Pos Select 41, the selection conditions of Neg Select 43, and the data inputs of Pos Shift 42 and Neg Shift 44.

Sign determination module 23 evaluates the positive leading zero line (i.e., POS_LINE$_i$) and the negative leading one line (i.e., NEG_LINE$_i$) in parallel with the operation of LZA 24 described above. Sign determination module 23 includes a P_cell 51, a G_cell 52, two M-cells 53 and 54, and a S_cell 55.

The condition for sign determination is to find the rightmost non-zero value, starting with the most significant bit, between the bits within the positive leading zero line and the negative leading zero line. If the positive leading zero line has a first non-zero bit further to the right in the bit location than the negative leading zero line does, sign determination module 23 will output a positive selection signal to LZA 24. If the negative leading zero line has a first non-zero bit further to the right in the bit location than the positive leading zero line does, sign determination module 23 will output a negative selection signal to LZA 24. For example, when $$POS\_LINE=0^k\ 0\ \text{and}\ NEG\_LINE=0^k\ 1,$$

or $$POS\_LINE=1^k\ 0\ \text{and}\ NEG\_LINE=1^k\ 1,$$

where k implies repetition of the preceding digit for a total of k times (such as $0^k$=0 0 . . . 0), sign determination module 23 will output a positive selection signal to LZA 24 because the positive leading zero line has the first non-zero bit further to the right in the bit location than the negative leading zero line does. When $$POS\_LINE=0^k\ 1\ \text{and}\ NEG\_LINE=0^k\ 0,$$

or $$POS\_LINE=1^k\ 1\ \text{and}\ NEG\_LINE=1^k\ 0,$$

sign determination module 23 will output a negative selection signal to LZA 24 because the negative leading zero line has a first non-zero bit further to the right in the bit location than the positive leading zero line does. The above-mentioned relationships can be rewritten in a matrix format, with the NEG_LINE inverted, as follows:

$$\begin{pmatrix} POS\_LINE \\ \overline{NEG\_LINE} \end{pmatrix} = \begin{pmatrix} 0 & 1 \\ 1 & 0 \end{pmatrix}^* \begin{pmatrix} 0 \\ 0 \end{pmatrix}$$
$$= M^*W$$
$$= MM\ldots MW$$

for positive selection, where * indicates any possible k≧0, and $$\begin{pmatrix} POS\_LINE \\ \overline{NEG\_LINE} \end{pmatrix} = \begin{pmatrix} 0 & 1 \\ 1 & 0 \end{pmatrix}^* \begin{pmatrix} 1 \\ 1 \end{pmatrix}$$
$$= M^*N$$
$$= MM\ldots MN$$

for negative selection, where M, N, and W are propagate, generate and kill functions, respectively, defined as follows:

$$M_i=POS\_LINE_i\ XOR\ \overline{NEG\_LINE}_i; \qquad (6)$$

$$N_i=POS\_LINE_i\ AND\ \overline{NEG\_LINE}_i; \qquad (7)$$

and $$W_i=\overline{POS\_LINE}_i\ AND\ NEG\_LINE_i. \qquad (8)$$

In the case of two equivalent numbers, i.e., M*M, both negative and positive will generate the same control signals; thus, the two equivalent numbers can be included into a negative selection case for ease of implementation. Thus, the sign determination problem is reduced to the detection of N or W from the string given above.

For the first level of merging, a two-way merge structure is used to define M, N, and W as $M_g$, $N_g$, and $W_g$, respectively, such that $$M_{g\_i}=M_i\ M_{i+1} \qquad (9)$$

$$N_{g\_i}=N_i+M_i\ N_{i+1} \qquad (10)$$

$$W_{g\_i}=W_i+M_i\ W_{i+1} \qquad (11)$$

As shown in equation (6), $$M_i = \text{POS\_LINE}_i \text{ XOR } \overline{\text{NEG\_LINE}_i}$$

$$= \text{POS\_LINE}_i \text{ NEG\_LINE}_i + \overline{\text{POS\_LINE}_i} \ \overline{\text{NEG\_LINE}_i} \quad (12)$$

Substituting equations (4) and (5), $$\text{POS\_LINE}_i \text{ NEG\_LINE}_i = (P_i \text{ XNOR } Z_{i+1})(P_i \text{ XNOR } G_{i+1}) \quad (13)$$

$$= (P_i Z_{i+1} + \overline{P_i} \overline{Z_{i+1}})(P_i G_{i+1} + \overline{P_i} \overline{G_{i+1}})$$

$$= P_i Z_{i+1} G_{i+1} + \overline{P_i}(\overline{Z_{i+1} + G_{i+1}})$$

$$= P_i Z_{i+1} G_{i+1} + \overline{P_i} P_{i+1}$$

$$= \overline{P_i} P_{i+1}$$

(realizing that $Z_{i+1} G_{i+1} = 0$ and $\overline{Z_{i+1} + G_{i+1}} = P_{i+1}$) Similarly, $$\overline{\text{POS\_LINE}_i} \ \overline{\text{NEG\_LINE}_i} = P_i P_{i+1} \quad (14)$$

Using equations (13) and (14), equation (12) becomes $$M_i = \overline{P_i} P_{i+1} + P_i P_{i+1} \quad (15)$$

$$= (\overline{P_i} + P_i) P_{i+1}$$

$$= P_{i+1} \text{ (since } \overline{P_i} + P_i = 1\text{)}$$

Similarly, $$M_{i+1} = P_{i+2} \quad (16)$$

Using equations (7), (8) and (15), (16), equations (9), (10), and (11) (i.e., outputs of G_cell 52) can be rewritten as follows:

$$M_{g\_i} = P_{i+1} P_{i+2}$$

$$N_{g\_i} = \text{POS\_LINE}_i \ \overline{\text{NEG\_LINE}_{i+1}} + P_{i+1} \text{ POS\_LINE}_{i+1} \ \overline{\text{NEG\_LINE}_{i+1}}$$

$$W_{g\_i} = \overline{\text{POS\_LINE}_i} \text{ NEG\_LINE}_i + P_{i+1} \overline{\text{POS\_LINE}_{i+1}} \text{ NEG\_LINE}_{i+1}$$

The output of P_cell 51 is $P_i$, which is evaluated by $A_i$ XOR $B_i$.

For a second level of merging, if a 4-way reduction tree is utilized, the outputs of M_cell 53 will be $M_{g\_4}$, $N_{g\_4}$, and $W_{g\_4}$, which are evaluated as follows:

$$M_4 = M_g(0) M_g(1) M_g(2) M_g(3)$$

$$N_4 = N_g(0) + M_g(0) N_g(1) + M_g(0) M_g(1) N_g(2) + M_g(0) M_g(1) M_g(2) N_g(3)$$

$$W_4 = W_g(0) + M_g(0) W_g(1) + M_g(0) M_g(1) W_g(2) + M_g(0) M_g(1) M_g(2) W_g(3)$$

The outputs of M_cell 54 are $M_4$, $N_4$, and $W_4$, which are evaluated using the above equations, as follows:

$$M_{g\_4} = M_4(0) M_4(1) M_4(2) M_4(3)$$

$$N_{g\_4} = N_4(0) + M_4(0) N_4(1) + M_4(0) M_4(1) N_4(2) + M_{g\_4}(0) M_{g\_4}(1) M_{g\_4}(2) N_{g\_4}(3)$$

$$W_{g\_4} = W_4(0) + M_4(0) W_4(1) + M_4(0) M_4(1) W_4(2) + M_4(0) M_4(1) M_4(2) W_4(3)$$

The output of S_cell 55 is a selection signal. A positive sign will be selected (i.e., SEL_POS) when $$W_{g\_4}(0) + M_{g\_4}(0) W_{g\_4}(1) + M_{g\_4}(0) M_{g\_4}(1) W_{g\_4}(2) + M_{g\_4}(0) M_{g\_4}(1) M_{g\_4}(2) W_{g\_4}(3) = 1,$$

and a negative sign will be selected (i.e., SEL_NEG) when $$N_{g\_4}(0) + M_{g\_4}(0) N_{g\_4}(1) + M_{g\_4}(0) M_{g\_4}(1) N_{g\_4}(2) + M_{g\_4}(0) M_{g\_4}(1) M_{g\_4}(2) N_{g\_4}(3) = 1.$$

As has been described, the present invention provides an improved LZA having an integrated positive/negative selection within a floating-point processor. The present invention determines the shift amount in parallel with the normalization process.

Although two operands, each having 107 bits in length, are utilized the preferred embodiment of the present invention, it is understood by those skilled in the art that the principle as disclosed is applicable to operands of any length. Further, even though a single adder is utilized to illustrate a preferred 4-embodiment, the present invention may also be applied to a normalized fused multiplier-adder.

While the invention has been particularly shown and described with reference to a preferred embodiment, it will be understood by those skilled in the art that various changes in form and detail may be made therein without departing from the spirit and scope of the invention.

What is claimed is:

1. An apparatus for anticipating leading zeros/ones in a floating-point processor, comprising:
    an adder;
    a leading-zero anticipator for generating a leading zeros string and a leading ones string by examining carry propagates ($P_i$), generates ($G_i$) and kills ($Z_i$) of two adjacent bits of two input operands ($A_i$ and $B_i$) of said adder, wherein said leading zeros string is for a positive sum and said leading ones string is for a negative sum; and
    a sign determination module for determining a sign of an output of said two input operands in parallel with calculating a normalization shift amount from said leading zeros string and said leading ones string.

2. The apparatus according to claim 1, wherein said sign determination module further includes a means for locating a rightmost non-zero value, starting with the most significant bit, within bits of a positive leading zero line and a negative leading zero line.

3. The apparatus according to claim 2, wherein said sign determination module outputs a positive selection signal when said positive leading zero line has a first non-zero bit further to the right in the bit location than said negative leading zero line does.

4. The apparatus according to claim 2, wherein said sign determination module outputs a positive selection signal when said negative leading zero line has a first non-zero bit further to the right in the bit location than said positive leading zero line does.

5. A floating-point processor, comprising:
    an instruction unit; and
    a floating-point unit coupled to said instruction unit, wherein said floating-point unit includes:
        an adder;
        a leading-zero anticipator for generating a leading zeros string and a leading ones string by examining carry propagates ($P_i$), generates ($G_i$) and kills ($Z_i$) of two adjacent bits of two input operands ($A_i$ and $B_i$) of said adder, wherein said leading zeros string is for a positive sum and said leading ones string is for a negative sum; and a sign determination module for determining a sign of an output of said two input operands in parallel with calculating a normalization shift amount from said leading zeros string and said leading ones string.

6. The floating-point processor according to claim 5, wherein said sign determination module further includes a means for locating a rightmost non-zero value, starting with the most significant bit, within bits of a positive leading zero line and a negative leading zero line.

7. The floating-point processor according to claim 6, wherein said sign determination module outputs a positive selection signal when said positive leading zero line has a first non-zero bit further to the right in the bit location than said negative leading zero line does.

8. The floating-point processor according to claim 6, wherein said sign determination module outputs a positive selection signal when said negative leading zero line has a first non-zero bit further to the right in the bit location than said positive leading zero line does.

9. A method for anticipating leading zeros/ones in a floating-point processor, said method comprising the steps of:

generating a leading zeros string and a leading ones string by examining carry propagates ($P_i$), generates ($G_i$) and kills ($Z_i$) of two adjacent bits of two input operands ($A_i$ and $B_i$) of said adder, wherein said leading zeros string is for a positive sum and said leading ones string is for a negative sum; and determining a sign of an output of said two input operands in concurrence with calculating a normalization shift amount from said leading zeros string and said leading ones string.

10. The method according to claim 9, wherein said sign determination module further includes a means for locating a rightmost non-zero value, starting with the most significant bit, within bits of a positive leading zero line and a negative leading zero line.

11. The method according to claim 10, wherein said sign determining step further includes a step of outputing a positive selection signal when said positive leading zero line has a first non-zero bit further to the right in the bit location than said negative leading zero line does.

12. The method according to claim 10, wherein said sign determining step further includes a step of outputing a positive selection signal when said negative leading zero line has a first non-zero bit further to the right in the bit location than said positive leading zero line does.

* * * * *